US007920161B2

(12) United States Patent
Niemi et al.

(10) Patent No.: US 7,920,161 B2
(45) Date of Patent: Apr. 5, 2011

(54) METHOD FOR FORMING COMBINED DIGITAL IMAGES

(75) Inventors: Sami Niemi, Skanör (SE); Johan Windmark, Lund (SE); Zhengrong Yao, Lund (SE)

(73) Assignee: Scalado AB, Lund (SE)

( * ) Notice: Subject to any disclaimer, the term of this patent is extended or adjusted under 35 U.S.C. 154(b) by 466 days.

(21) Appl. No.: 11/634,264

(22) Filed: Dec. 6, 2006

(65) Prior Publication Data

US 2008/0018748 A1 Jan. 24, 2008

(30) Foreign Application Priority Data

Jul. 19, 2006 (SE) ...................................... 0601577

(51) Int. Cl.
*H04N 5/262* (2006.01)
(52) U.S. Cl. ........................................ 348/36; 348/239
(58) Field of Classification Search .................... 348/36, 348/208.1, 208.2, 208.3, 239
See application file for complete search history.

(56) References Cited

U.S. PATENT DOCUMENTS

| 6,304,284 | B1* | 10/2001 | Dunton et al. ................... 348/36 |
| 6,930,703 | B1* | 8/2005 | Hubel et al. ............. 348/208.16 |
| 7,623,733 | B2* | 11/2009 | Hirosawa ....................... 348/239 |
| 2001/0048802 | A1* | 12/2001 | Nakajima et al. .............. 348/232 |
| 2004/0174434 | A1* | 9/2004 | Walker et al. .............. 348/231.6 |
| 2004/0218833 | A1* | 11/2004 | Ejiri et al. ................... 348/218.1 |
| 2005/0168594 | A1 | 8/2005 | Larson |
| 2006/0050152 | A1* | 3/2006 | Rai et al. ..................... 348/218.1 |
| 2006/0181619 | A1* | 8/2006 | Liow et al. ..................... 348/239 |
| 2006/0235765 | A1* | 10/2006 | David ....................... 348/207.99 |
| 2007/0025723 | A1* | 2/2007 | Baudisch et al. ............. 396/287 |
| 2007/0081081 | A1* | 4/2007 | Cheng ........................ 348/218.1 |
| 2007/0274705 | A1* | 11/2007 | Kashiwa et al. .............. 348/262 |

FOREIGN PATENT DOCUMENTS

WO WO 2005112437 A1 * 11/2005
WO WO2006002796 A1 * 12/2006

OTHER PUBLICATIONS

Baudisch et al., "Panoramic Viewfinder: Providing a Real-Time Preview to Help Users Avoid Flaws in Panoramic Pictures," Proceedings of OZCHI, 2005.

* cited by examiner

*Primary Examiner* — Jason Whipkey
(74) *Attorney, Agent, or Firm* — Finnegan, Henderson, Farabow, Garrett & Dunner, L.L.P.

(57) ABSTRACT

A method for acquiring at least two digital images by means of a digital camera, wherein the digital images are to be stitched into a panoramic image, comprises capturing a first digital image, wherein a first scenery is imaged, determining a relation between the first scenery and a second scenery being viewed by the digital camera, while said second scenery being viewed by the digital camera is changed, analysing the relation between the first scenery and the second scenery being viewed by the digital camera in order to identify an appropriate view to be captured by the digital camera in a second digital image, and indicating to a user that the camera is directed towards an appropriate view for capturing a second digital image.

3 Claims, 2 Drawing Sheets

METHOD FOR FORMING COMBINED DIGITAL IMAGES

This application claims priority from Swedish Patent Application No. 0601577-0, filed Jul. 19, 2006, the contents of which are hereby incorporated by reference in their entirety.

TECHNICAL FIELD

The present invention relates to a method for acquiring at least two digital images by means of a digital camera, wherein the digital images are to be stitched into a combined image.

BACKGROUND OF THE INVENTION

When using a digital camera to capture images of a landscape, an image with a wide field of view may often be desired. This may be artificially created by capturing a plurality of images which are then stitched together to create a large image of the landscape.

A most effective result of the stitched image may be obtained by capturing images that are suitable for being stitched together. In this regard, the images should be captured with an appropriate overlap and a good alignment. An overlap is needed to enable the images to be seamlessly stitched together. Further, the final panoramic image is limited in the vertical direction by the top of the lowest image of the plurality of images forming the panorama, and the bottom of the highest image. Thus, a good alignment will enable the final panoramic image to be created with a maximum or near maximum vertical size.

It is difficult to capture images optimally suited for creating a panoramic image even for an experienced photographer. In order to achieve adequate results, it may be required to use a tripod.

Therefore, there is a need for aiding a user in taking images that are suited for forming a panoramic image. In US 2005/0168594, a method for guiding a user through the image-taking procedure for creating a panoramic photograph is disclosed. According to the method, an algorithm displays indicia that are overlaid and moved over a live image during the image-taking process to help align the subsequent image to be taken with the previously recorded image.

Thus, the display simultaneously shows to the user a part of the image that was previously recorded and a part of the image that will be recorded. This helps the user to correctly align and correlate the images to each other.

Another method of helping users to acquire panoramic images is described in P. Baudisch, D. Tan, D. Steedly, E. Rudolph, M. Uyttendaele, C. Pal, and R. Szeliski, "Panoramic Viewfinder: Providing a Real-Time Preview to Help Users Avoid Flaws in Panoramic Pictures", Proceedings of OZCHI 2005. According to this method, a panoramic viewfinder is used, which simultaneously shows three different types of information to the user; (1) a preview shows the panorama in its current state of completion, (2) the viewfinder shows what the camera sees at the moment, and (3) the real-time cropping frame shows the extent the panorama will have after cropping if the user stopped shooting at this instant.

However, panoramic images are often captured in a bright environment, which makes it hard to view an overlap of images and therefore the display is ineffective in helping the user in the image-taking process. Further, if a self-portrait is desired, the user is not able to see the viewfinder and is not helped at all.

Therefore, an improved user interface for aiding a user in taking several images to be stitched together is desired.

SUMMARY OF THE INVENTION

It is an object of the invention to provide a method that aids a user in taking images to be stitched into a combined image. It is a specific object of the invention to provide such a method that is effective in bright environments and when a self-portrait is taken.

These and other objects of the invention, which may become apparent from the following description, are at least partly achieved by means of a method according to any of the independent claims. Specific embodiments are set out in the dependent claims.

Thus, according to a first aspect of the invention, a method for acquiring at least two digital images by means of a digital camera, wherein the digital images are to be stitched into a combined image, comprises capturing a first digital image, wherein a first scenery is imaged; determining a relation between the first scenery and a second scenery being viewed by the digital camera, while said second scenery being viewed by the digital camera is changed; analysing the relation between the first scenery and the second scenery being viewed by the digital camera in order to identify an appropriate view to be captured by the digital camera in a second digital image for facilitating stitching of the first and second digital images; and indicating to the user that the camera is directed towards an appropriate view for capturing a second digital image.

By means of the method, the digital camera determines the relationship between the previously captured image and the image to be captured. Thus, the camera itself determines the view to be imaged in the image to be captured. The user is then guided by an indication from the digital camera that the camera is properly directed for capturing an image. Thus, guidance of a user for aiding in acquiring combined images may be accomplished in bright environments and even when a user is not able to see the viewfinder (such as when taking a self-portrait).

The method deprives the user of the control of the capturing of the images since the second scenery to be imaged is determined by the camera. However, this enables the camera to guide the user in a more effective manner.

The indication to the user that the camera is directed towards an appropriate view need not necessarily guide the user to an optimal view for capturing a second digital image. The indication may provide information to the user of how far away the present view is from an optimal view. The user may thus use this information to control capturing of a second digital image when the user finds it appropriate. Further, the indication may inform the user of a situation when the camera is being moved in a direction away from a suitable view of a second image. In this situation, an indication may be given that a second image is to be captured before the camera is moved so far away from the suitable view that the captured images are no longer suited to be stitched at all. Thus, the indication may force a second image to be captured, wherein the second image is not depicting a particularly suitable view for stitching, but the second image is depicting a view that is able to be stitched to the first image.

In the context of this application, the term "combined image" should be construed as an image that is formed from a combination of at least two captured images. The captured images may be formed into a panoramic image that is oblong and shows a wide angle of a scenery. However, the captured images may be related to each other in any way. For example, they may form a matrix of n times m images, where n and m are arbitrary numbers. Further, the combined image need not be rectangular. On the contrary, the captured images may be stitched together to form a combined image of an arbitrary shape.

The second scenery may change in different ways. The scenery may change by movements taking place in front of the camera. In such case, the camera may be held still, while the scenery in front of the camera is changing. Then, several images may be taken by a stationary camera. Movements in relation to a background may then be illustrated in the combined image. The combined image may thus be a combination of several images that are placed on top of each other.

Alternatively, the second scenery may change by the camera being moved. The determining may comprise keeping track of a position of the first scenery in relation to the second scenery being viewed by the digital camera, while the digital camera is moved to change said second scenery being viewed by the digital camera. In this case, the camera is being moved and, thus, the scenery being viewed by the camera is changed. The relation between the first scenery and the changing second scenery is monitored in order to enable a second image to be captured that is suitable for stitching to the first image.

According to one embodiment, keeping track of a position of the first scenery in relation to the second scenery comprises comparing images. This implies that movement of the camera is monitored by comparing views towards which the camera is being directed. This may be realized, for instance, by continuously comparing temporary small images being captured by the viewfinder. A comparison may be made to any of the previously captured temporary images in order to constantly update the relation between the second scenery and the first scenery.

According to another embodiment, keeping track of a position of the first scenery in relation to the second scenery comprises sensing a change in direction of the digital camera. The sensing may be achieved e.g. by means of a gyroscope, that detects any rotation of the digital camera. Alternatively, the sensing may be achieved by means of a compass, whereby rotations in relation to the earth's magnetic field may be detected. With knowledge of a viewing angle of the digital camera, an allowed rotation of the digital camera may be set.

The method may further comprise communicating information to the user related to the change of the second scenery. This implies that the camera may give the user information of the status of a movement of the camera and thereby guide the movement such that the camera may be directed towards an appropriate part of the scenery.

According to one embodiment, the communicating may comprise emitting a signal that is tactile for a user. The human body responds very quickly to the tactile sense. Therefore, by emitting any kind of message or signal that may be sensed by the user, the user may very quickly react to the signal.

The tactile signal may be accomplished in different ways. It may be in form of a small electric impulse, a change in temperature or a sensed vibration.

For example, the emitting may comprise activating a vibrator to inform a user of the relation between the first scenery and the second scenery. The vibrator may be activated during tracking when the digital camera is moved and be deactivated to indicate that the camera is directed towards an appropriate view for capturing an image. This implies that the user is continuously guided in the movement of the camera. The guidance is not affected by a bright or noisy environment, since the user may sense the deactivation of the vibrator by means of his hand holding the camera. The user will then know that the camera has been properly directed.

Of course, the vibrator may be used in other ways to communicate with the user. The vibrator may be used in the reverse manner, i.e. the vibrator being activated for a short period of time when the camera has been properly directed. The intensity of the vibrator may alternatively be varied in order to communicate to the user how far away the camera is from being directed towards an appropriate or an optimal view.

According to an alternative embodiment, the communicating may comprise emitting a sound signal from the digital camera in order to indicate that the camera is directed towards an appropriate view for capturing an image.

According to another alternative embodiment, the communicating may comprise displaying a schematic representation of the relation between the first scenery and the second scenery being viewed by the digital camera.

These alternative embodiments also enable a user to be guided in a bright environment when the details of the viewfinder are difficult to discern.

The method may further comprise capturing a second digital image when the camera is directed towards an appropriate view, said capturing being automatically performed by the digital camera.

In this way, an automated method of acquiring a combined image is achieved. Thus, the user will not need to push the capture button during the acquiring of the second and subsequent images. This implies that the camera will not be moved out of position due to the capture button being pressed. Instead, the user may focus entirely on aiming the camera in a correct direction.

Moreover, the communication of information related to the movement of the camera to the user may allow the user to temporarily stop moving the camera at various positions when it is indicated that an image is to be acquired. Thus, motion blur is prevented and high quality sharp images may be acquired.

This method allows several images that are to form a combined image to be captured very quickly. The user simply pushes the capture button to start acquiring the images and then sweeps the camera over the scenery to be imaged. The user is continuously guided when to temporarily stop sweeping the camera to allow another image to be captured.

This is a highly automated method that will help the user to acquire images for creation of a combined image. The user will not need to take any decisions regarding when to capture images. In fact, once the user has started the procedure to acquire a combined image, the user may merely follow instructions communicated by the camera. In particular, the user will not need to see the viewfinder of the camera and may thus acquire a self-portrait or a combined image in bright or dark environment.

The indicating may comprise communicating information to the user that an image will be automatically captured in advance of the actual capture of the image. This implies that the user will be able to stop movement of the digital camera before the second digital image is captured. Thus, motion blur may effectively be eliminated.

The automatic capture may be performed a predefined period of time after information is communicated to the user that a second image is about to be captured. Alternatively, the automatic capture may be performed in response to detection that the movement of the camera has been stopped.

The analysing may use a predefined desired overlap between adjacent images for identifying an appropriate view. This overlap may be set to fit the optical set-up of the camera and, thus, optimal combined images may be obtained by using a programmed algorithm for acquiring images.

According to an alternative, the analysing may comprise determining whether conditions prevail that are appropriate for capturing a second digital image. For example, the analysis may detect that the camera is hardly being moved. In such case, the conditions are such that a second image may appropriately be captured. Since the camera is only slightly moved, if moved at all, motion blur may be avoided. Thus, if the camera is aimed at a view that may be appropriate for stitching and these non-movement conditions of the camera prevail, a decision may be taken to capture a second digital image. As an alternative, the analysis may detect that the camera is directed towards a view being particularly suited for stitching to previously captured images. This may be detected as appropriate conditions for capturing a second digital image, even if the camera is being moved at the time. An indication may then be communicated to the user that an image will soon be captured allowing the user to stop the movement of the camera at the appropriate position. Thereafter, a second digital image is captured.

The method may further comprise displaying an animation of desired movement of the digital camera, wherein the animation is synchronised with the actual movement of the digital camera. This animation gives the user an easy understanding of how to move the camera. For example, the animation may show to the user that the camera is merely to be rotated and that neither any linear movement of the camera nor any tilting movement of the camera is to be made if a panoramic image is to be captured.

According to a second aspect of the invention, a method for acquiring at least two digital images by means of a digital camera, wherein the digital images are to be stitched into a combined image, comprises: capturing a first digital image, wherein a first scenery is imaged; allowing a user to move the digital camera to direct the camera towards a second scenery partly overlapping the first scenery; communicating to a user that a second digital image is about to be automatically captured; and automatically capturing a second digital image.

The method aids the user in acquiring images for forming a combined image, wherein motion blur in the images is prevented. Since the user is informed that a digital image is to be captured before the image is actually captured, the user will be able to stop movement of the camera. The automatic capture of the second image implies that no motion blur may be formed due to the user pressing a capture button.

Further, when several subsequent images are to be captured, the communication to the user may occur at regular intervals. This implies that the user may be aided in sweeping a scenery and capturing images appropriate for stitching. Since the user need not make any decisions regarding appropriate directions of the camera, the user may move the camera in a steady, uniform manner. This implies that the difference in viewing angle between adjacent images may be constant throughout sweeping of the scenery. Thereby, the user is aided by the camera to obtain images suitable for stitching into a combined image, even though no analysis is made regarding the relation between the imaged sceneries during capture of images.

The communication to the user may be achieved in many different ways, as described above with reference to the first aspect of the invention.

The automatic capture of the second digital image may be performed at a predetermined period of time after said communicating. The predetermined period of time may be any suitable time period allowing the user to stop movement of the camera before the second digital image is captured. This predetermined period of time may typically be less than a second.

Alternatively, the method further comprises detecting a stopped movement of the digital camera, wherein the automatic capturing of the second digital image is performed in response to detection of a stopped movement. This implies that it is positively ensured that the second digital image does not contain any motion blur.

According to a third aspect of the invention, a method for acquiring at least two digital images by means of a digital camera, wherein the digital images are to be stitched into a combined image, comprises: capturing a first digital image, wherein a first scenery is imaged; allowing a user to move the digital camera to direct the camera towards a second scenery; detecting a stopped movement of the digital camera; and automatically capturing a second digital image in response to detection of a stopped movement.

According to this aspect of the invention, the user controls the positioning of the camera when an image is captured. By stopping movement of the camera, the user will initiate capturing of an image. This implies that the images are captured without any motion blur. Further, since images are automatically captured in response to a detected stopped movement of the digital camera, the images may be very quickly captured. This allows the user to move the camera in a rapid manner and thereby the user may be able to move the camera in a steady, uniform manner. Also, the automatic capture of the second image implies that no motion blur may be formed due to the user pressing a capture button.

BRIEF DESCRIPTION OF DRAWINGS

The invention will now be described in further detail by way of example under reference to the accompanying drawings.

DETAILED DESCRIPTION OF A PREFERRED EMBODIMENT

Figure 1:
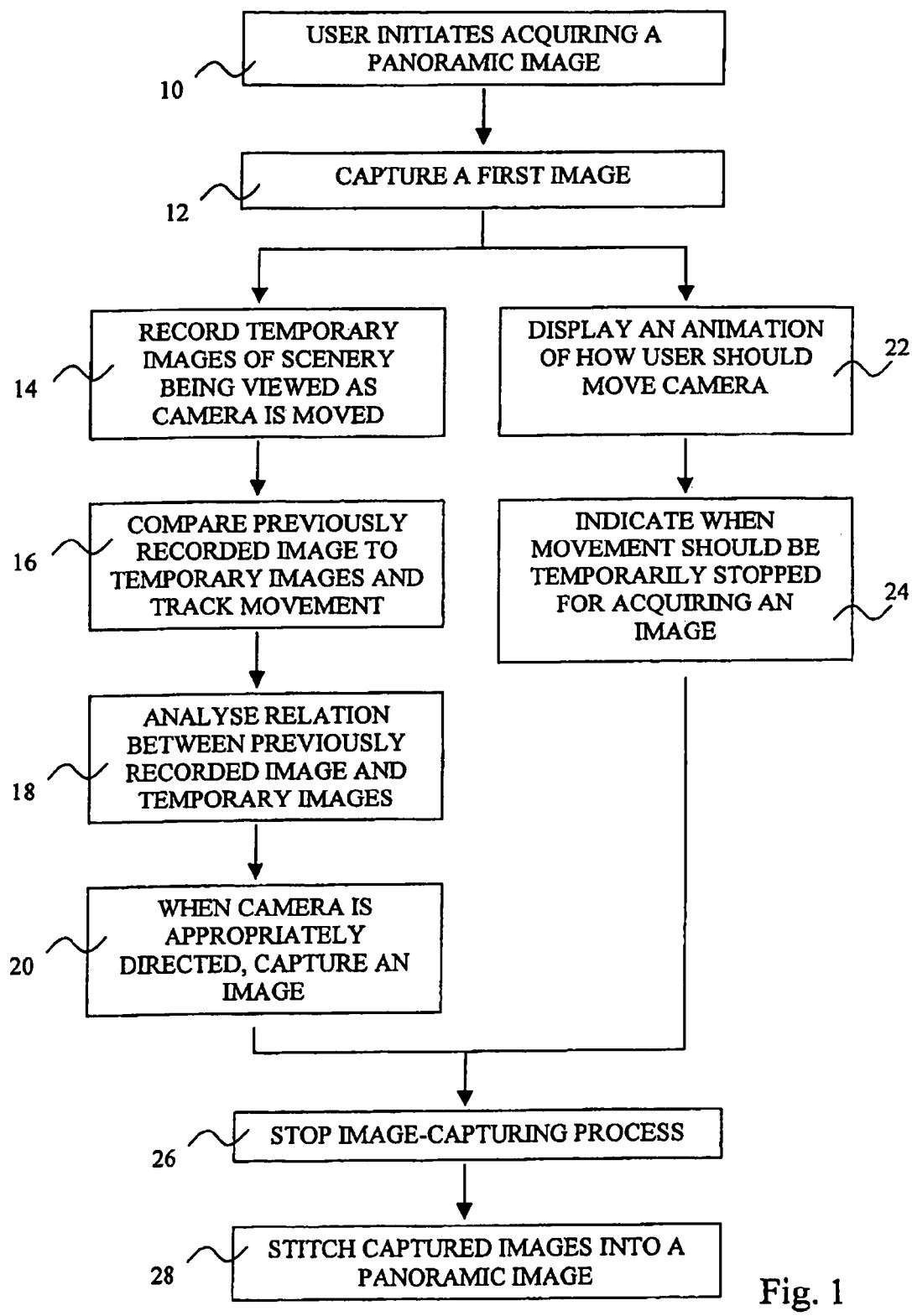
FIG. 1 is a flow chart of a method according to an embodiment of the invention.

Referring now to FIG. 1, a method of guiding a user in acquiring digital images to be stitched into a combined image will be described.

A user initiates the acquiring of the digital images by pressing a capture button in a combined image capturing mode of the digital camera, step 10. The camera is thus activated to capture a first image of a first scenery viewed by the digital camera, step 12. Further, the camera is activated to guide the user in directing the camera towards appropriate views of further sceneries for forming the combined image.

The camera records temporary images of the scenery being viewed by the camera as the camera is moved, step 14. These temporary images are displayed on the viewfinder. Further, the previously recorded image is compared to the temporary images and a position of the scenery being imaged in the previously recorded image is tracked, step 16. The camera analyses the relation between the scenery that has been imaged in the previously recorded digital image and the scenery being viewed, step 18. Based on this analysis, the camera decides whether the camera is directed towards an appropriate view for capturing a subsequent image. When the camera is directed towards an appropriate view, the camera automatically captures a digital image, step 20.

The temporary images being continuously captured may be compared to each other for continuously updating how the camera has been moved. This implies that only small images are being compared to each other keeping computation complexity of the tracking relatively low. The position of the scenery being imaged in the previously recorded image may be modelled by a first temporary image that is registered in the viewfinder immediately after capturing an image.

A predefined overlap may be programmed in the camera. Thus, the camera analyses the overlap of the scenery that has been imaged with the scenery being viewed in order to determine the overlap. During movement of the camera, the overlap continuously decreases. When the overlap reaches the predefined level, the analysis decides that the camera is directed towards an appropriate view.

The predefined overlap allows the camera to be appropriately programmed to suit the optical set-up of the camera. However, the user may be allowed to change the predefined overlap before capturing a combined image.

The tracking may be performed in real time, since the tracking uses the image of the viewfinder, which is very small. Tracking may be performed in any suitable way to compare and match the previously recorded image to the temporary image in the viewfinder, as will be appreciated by those skilled in the art. For example, an optical flow algorithm or a two-dimensional correlation algorithm may be used for comparing the images to each other in order to determine whether the images correlate in such a way that it is appropriate to capture another image.

As an alternative to using a predefined overlap, the analysis may comprise determining whether conditions prevail that are appropriate for capturing a second digital image. For example, the analysis may detect that the camera is hardly being moved. In such case, the conditions are such that a second image may appropriately be captured. Since the camera is only slightly moved, if moved at all, motion blur may be avoided. Thus, if the camera is aimed at a view that may be appropriate for stitching and these non-movement conditions of the camera prevail, a decision may be taken to capture a second digital image.

As a further alternative, the analysis may detect that the camera is directed towards a view being particularly suited for stitching to previously captured images. This may be detected as appropriate conditions for capturing a second digital image, even if the camera is being moved at the time. An indication may then be communicated to the user that an image will soon be captured allowing the user to stop the movement of the camera at the appropriate position. Thereafter, a second digital image is captured.

The camera is arranged to capture the subsequent image automatically when the analysis decides that the camera is directed towards an appropriate view. This implies that the user will not need to give any further input to the camera, such as pressing a capture button. Thus, the user may focus on directing the camera correctly and, in particular, no movement of the camera out of position will occur due to the user shaking when the button is pressed.

However, according to an alternative embodiment, the user may initiate the capturing of each image by pressing a button when the user has been guided by the camera to direct the camera towards the appropriate view.

During the movement of the camera for capturing images of different parts of the scenery, the camera continuously guides the user in the movement. Thus, simultaneously with steps 14-20, the camera informs the user of how to move the camera. The camera displays an animation of how the user should move the camera, step 22. Further, the camera indicates when the movement should be temporarily stopped for acquiring an image, step 24.

The camera may indicate when the movement should be temporarily stopped in many different ways. According to a first alternative, the camera activates a vibrator while the camera is moved. When the camera is properly directed for capturing an image, the vibrator is deactivated. Thus, a user will sense the vibrator being activated with his hand holding the camera. This implies that no visual or audible communication with the user is needed, which may be advantageous when capturing a combined image in a bright or dark environment or in a noisy environment. Further, the physical response to a tactile impulse is very quick and, therefore, the user may quickly react on the sensed communication. The vibrator may be used in many different ways to communicate with the user. For example, the intensity of the vibration may be increased as an appropriate view is approached. Thus, the user may get feedback on how far away the camera is from being directed towards an appropriate view.

According to a second alternative, the camera emits a sound signal when an image is to be captured. The first two alternatives are especially advantageous in conditions when the user has trouble seeing visual indications. For example, this facilitates capturing a panoramic self-portrait or other combined images when the viewfinder may not be watched.

According to a third alternative, the camera displays a schematic view of the relation of the scenery imaged in the previously recorded image to the scenery being viewed. The previously recorded image may be represented by a first rectangle and the scenery being viewed may be represented by a second rectangle being moved relative the first rectangle. A third rectangle indicating the desired position of the subsequent image to be captured may also be displayed. Thus, the user may continuously see how the part of the scenery being viewed approaches the appropriate view for capturing the subsequent image. This gives the user continuous feedback of how close the camera view is to the subsequent desired view and may thus improve the ability of the user to aim the camera correctly.

Two or more of the above alternatives may be used in conjunction with each other. In such manner, the guidance of the user may be further improved.

When the entire scenery to be imaged in the combined image has been swept, the image-capturing process is stopped, step 26. The user may stop the process by pushing a button or stopping the movement of the camera. Alternatively, the process may be stopped when a predetermined number of images to be stitched together have been captured.

When all needed images have been captured, the images are stitched together to form one large combined image, step 28. The captured images may be processed in order to facilitate matching. For instance, a cylindrical projection and lens correction of the images may be performed. Then the captured and processed images are analysed in order to match them together appropriately. This may be performed using any suitable matching algorithm as will be appreciated by those skilled in the art.

According to an alternative embodiment, indications may be given to the user at regular time intervals that an image is to be captured. This implies that no tracking of the position of the scenery being imaged in the previously recorded image is performed. Further, no analysis whether the camera is directed towards an appropriate view is performed. The user is merely aided to stop movement of the camera at regular time intervals for allowing the camera to capture images without motion blur. Thereafter, the captured images may be stitched together into a combined image. The stitching of these images may require more computations, since no control that an acceptable overlap of the images was present occurred during capturing of the images. However, the regular timing of the capturing of the images makes it likely that a good result of stitching may be achieved.

According to another alternative embodiment, the user will further control when images are to be captured. A processor is arranged to detect when a movement of the camera has been stopped. In response to this non-movement, an image will be captured. Thus, there will be no motion blur in the captured image. By stopping movement of the camera at appropriate positions, the user may force the camera to capture images at these positions. The capturing of images is performed automatically as detection of non-movement is made.

The non-movement may be detected by means of comparing temporary images captured by the viewfinder to each other. When there is no or insignificant difference between two subsequent temporary images, this may be interpreted as the camera not being moved. In order to make the detection of non-movement more reliable, it may be required that no or merely insignificant difference should exist between three or more subsequent temporary images.

According to yet another alternative embodiment, the images to be combined may be captured without any movement of the camera occurring. Instead, the camera may be directed towards a scenery in which objects are moving. The camera may thus capture several images of a view having a common background, wherein movements are occurring. These images may be combined on top of each other such that the movements of objects may be illustrated in relation to the common background. In this case, a difference between the previously recorded image and the scenery being viewed may be tracked in a similar way as described above with reference to steps 16-18. When the difference is determined to be larger than a predetermined threshold, a new image may be captured.

Figure 2:
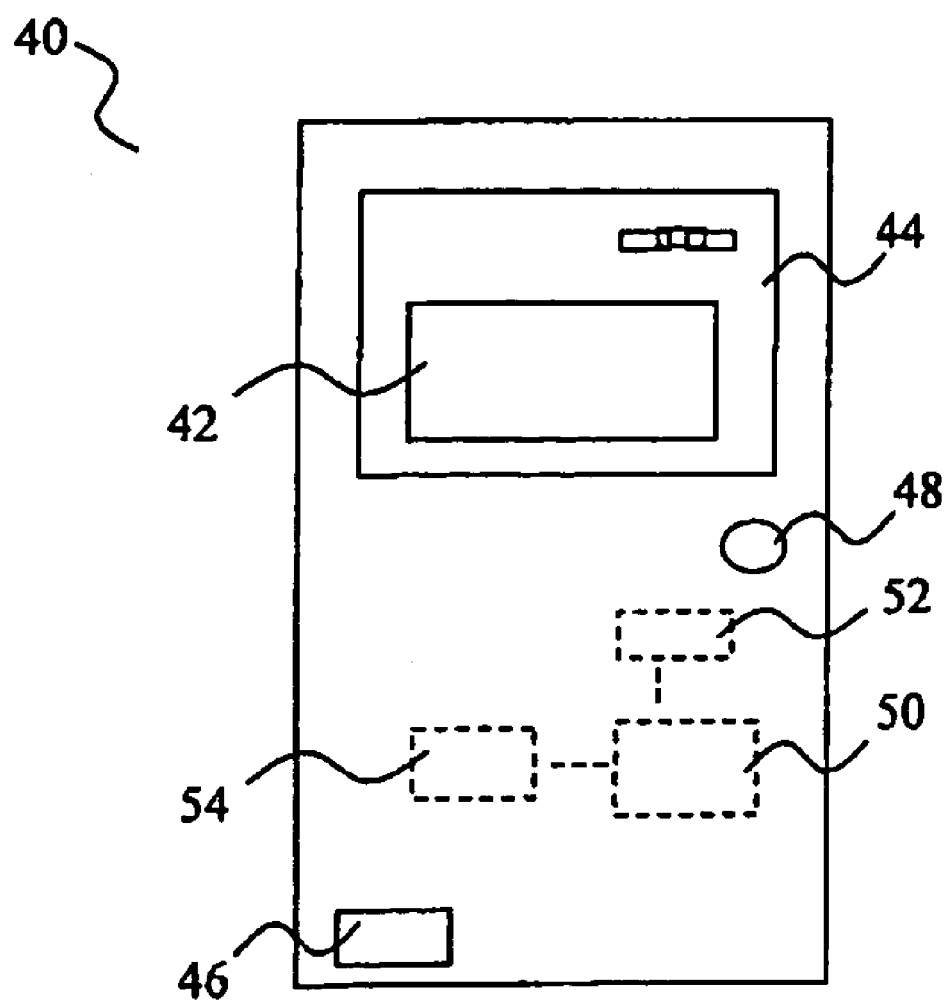
FIG. 2 is a schematic view of a digital camera to be used in the method.

Referring now to FIG. 2, a camera will be described that may be used in capturing a combined image according to the method described above. The camera 40 is specifically suited to be incorporated in a mobile phone, since a mobile phone camera is particularly used for acquiring images in a quick and simple manner. However, the method may be implemented in any kind of digital camera. The camera 40 comprises a viewfinder 42 in which the view of the camera is imaged. The viewfinder 42 forms a part of a display 44 and shows a live image of the view of the camera. The display 44 is further arranged to guide the user in capturing combined images. The display 44 may show an animation of how the camera should be moved and the display 44 may also present a schematic representation of the previously recorded image to the present view of the camera.

The camera 40 further comprises a vibrator 46, which may be activated and deactivated for guiding the user in movement of the camera. The camera 40 may also comprise a speaker 48 such that a sound signal may be emitted for guiding the user.

The camera 40 also comprises a processor unit 50. The processor unit 50 compares the previously recorded image to the present view of the camera and decides whether the camera is directed towards an appropriate view for capturing a subsequent image. The processor unit 50 also processes all captured images in order to stitch the images to a large combined image. The captured images may temporarily be stored in a RAM memory 52 during the image-capturing process and while the images are stitched together. When the combined image has been created it may be stored in a permanent memory 54.

It should be emphasized that the preferred embodiment described herein is in no way limiting and that many alternative embodiments are possible within the scope of protection defined by the appended claims.

For example, a decision whether the camera is directed towards an appropriate view for capturing a subsequent image may be performed using a sensor for detecting the direction of the camera. This sensor may e.g. be a gyroscope or a compass. The sensor may thus store information of a direction of the camera at time of capturing the previous image. When a change in direction exceeds a threshold, an indication may be given that it is time to capture a subsequent image.

The invention claimed is:

1. A method for forming a combined image from at least two digital images, comprising:
   capturing a first digital image by a digital camera, wherein a first scenery is imaged;
   allowing a user to move the digital camera towards a second scenery;
   detecting non-movement of the digital camera;
   automatically capturing the second scenery, where the second scenery is partially overlapping the first scenery, as a second digital image in response to detection of non-movement;
   allowing a user to move the digital camera towards a third scenery;
   detecting non-movement of the digital camera;
   automatically capturing the third scenery, where the third scenery is partially overlapping the second scenery, as a third digital image in response to detection of non-movement; and
   forming a combined image from the at least three digital images.

2. A method for forming a combined image from at least two digital images, comprising:
   capturing a first digital image by a digital camera, wherein a first scenery is imaged;
   allowing a user to move the digital camera towards a second scenery;
   detecting a stopped movement of the digital camera;
   automatically capturing the second scenery, where the second scenery is partially overlapping the first scenery, as a second digital image in response to detection of stopped movement;
   allowing a user to move the digital camera towards a third scenery;
   detecting non-movement of the digital camera;
   automatically capturing the third scenery, where the third scenery is partially overlapping the second scenery, as a third digital image in response to detection of non-movement; and
   forming a combined image from the at least three digital images.

3. A method for forming a combined image from at least two digital images, comprising:
   capturing a first digital image by a digital camera, wherein a first scenery is imaged;
   allowing a user to move the digital camera towards a second scenery;
   detecting a stopped movement or non-movement of the digital camera;
   automatically capturing the second scenery, where the second scenery is partially overlapping the first scenery, as a second digital image in response to detection of stopped movement or non-movement;
   allowing a user to move the digital camera towards a third scenery;

detecting a stopped movement or non-movement of the digital camera;

automatically capturing the third scenery, where the third scenery is partially overlapping the second scenery, as a third digital image in response to detection of stopped movement or non-movement; and forming a combined image from the at least three digital images.

* * * * *